June 3, 1958   W. R. FOLEY   2,837,112
ATMOSPHERIC PRESSURE RESPONSIVE VALVE MEANS FOR
MAINTAINING FLEXIBLE CONNECTOR SEAL MEANS
Filed March 11, 1955

INVENTOR.
William R. Foley

BY W. R. Robertson

AGENT

United States Patent Office 2,837,112
Patented June 3, 1958

2,837,112

ATMOSPHERIC PRESSURE RESPONSIVE VALVE MEANS FOR MAINTAINING FLEXIBLE CONNECTOR SEAL MEANS

William R. Foley, Portland, Conn., assignor to Chance Vought Aircraft, Incorporated, Dallas, Tex., a corporation of Delaware Application March 11, 1955, Serial No. 493,801

9 Claims. (Cl. 137—526)

This invention pertains to a pressure seal assembly between the ends of two adjoining sections of a fluid conduit wherein relative angular and/or axial motion may exist between the ends of the sections due to vibratory and/or expansive and/or contractive forces, or the like.

More specifically, this invention relates to a conduit flexible sealing connector which, in addition to providing a seal under the above circumstances, also seals the conduit when it has a positive, high internal pressure relative to the pressure externally of the conduit, and also when the conduit has a low, negative internal pressure relative to the conduit outer, ambient pressure.

A principal object of this invention is to provide a sealed flexible connection for pipes, conduits, or pressure or vacuum vessel sections which will provide a substantial seal under severe pressure differences and temperature conditions in the presence of substantial relative multidirectional movement between the sections.

Another object of the disclosed invention is the provision of an operable flexible sealing connector between two sections in a conduit wherein the fluid flow therein may have a fluctuation of pressure from that lower than the pressure externally of the conduit to a pressure greater than the conduit external pressure.

Another object of this invention is to provide a flexible sealing connector that requires no external clamps or fastening means.

A still further object of this invention is to provide a flexible sealing connector between the ends of two sections in a conduit which lie in a restricted or inaccessible area.

Yet another object of this invention is to provide a flexible sealing connector between two inaccessible ends of sections in a conduit, the connection of which merely involves the positioning of one end of a section in contiguity with the end of the other section.

Another object of this invention is to provide a flexible sealing connector that is self-protective from flow erosion.

Another object of my invention is to provide a more efficient, lighter in weight, durable, and inexpensive to manufacture flexible sealing connector readily adaptable to the adjoining section ends in a conduit.

Other objects and advantages of the invention will be apparent from the following detailed description, together with the accompanying drawings, submitted for purposes of illustration only and not intended to define the scope of the invention, reference being had for that purpose to the subjoined claims.

Figure 1:
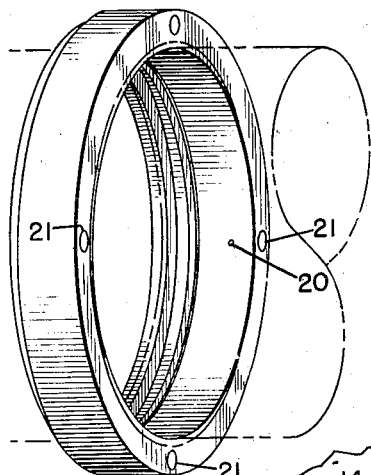
Fig. 1 is a perspective view of the new flexible sealing connector as would be applied to connect two juxtapositioned conduit section ends.
Figure 2:
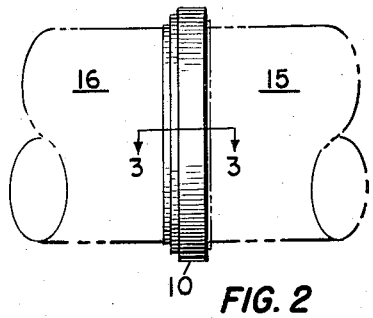
Fig. 2 is a plan view of my flexible sealing connector in a conduit, the latter shown in phantom.
Figure 3A:
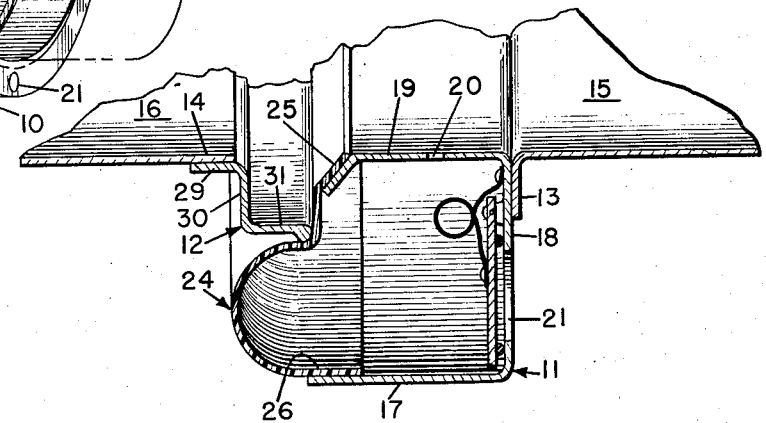
Figure 3B:
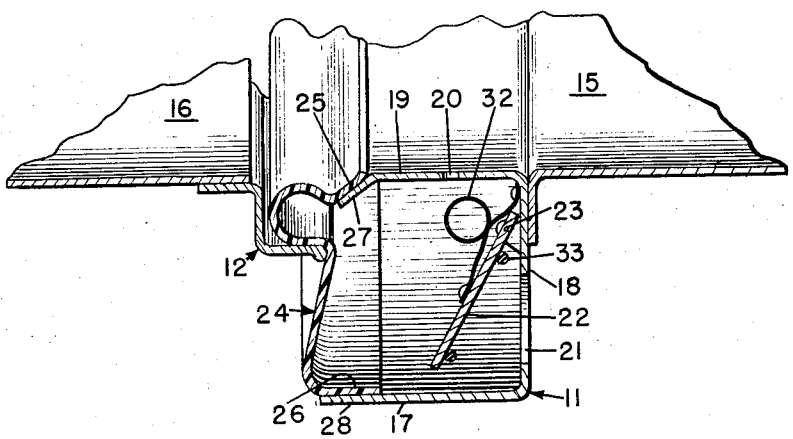

Fig. 3a is an orthographic sectional view taken at 3—3 on Fig. 2 illustrating the position that the parts of the connector would assume when the conduit internal pressure is greater than the pressure externally of the conduit; and Fig. 3b is an orthographic sectional view taken at 3—3 on Fig. 2 illustrating the position that the parts of the connector would assume when the conduit internal pressure is less than the pressure externally of the conduit.

While my invention may be used in many various ways on different types of fluid conduits, a specific example which I will describe hereinafter is the application of my new flexible sealing connector to an air intake conduit of an internal combustion reaction type engine, particularly wherein the pressure in the engine air intake conduit is less than the atmospheric pressure externally of the conduit when the engine is standing still or moving at low speeds, and wherein the engine air intake pressure is greater than the atmospheric pressure externally of the conduit when the engine is moving at a substantial speed due to ram air pressure.

The flexible sealing assembly or connector 10, comprises an annular or toroidal, flexible, pressure chamber 11 and an annular seal member 12, Figs. 3a and 3b, for mounting on the respective ends 13 and 14, Fig. 3a, of substantially equal sized conduit sections 15 and 16, respectively, for sealing the section ends together.

Hollow annular pressure chamber 11, Fig. 3a, comprises a metallic arcuate or channel member 17—18—19 and a diaphragm 24. The channel member base 18 is secured, as by welding or the like, to the radially or outwardly turned, annular flanged end 13 of section 15. This channel member 17—18—19, which if so desired, may be formed of a material other than metal, has an inner side wall 19 lying substantially coplanar with the walls of sections 15 and 16. Accordingly, with the use of the new sealing connector, no internally projecting parts of the connector or conduit are required which may be effected by flow erosion, or the wearing away of the protruding parts by the fluid flow thereover. Further, inner side wall 19 has one or more small orifices 20 for the passage of enough fluid from conduit sections 15 and 16 to maintain the pressure in the pressure chamber 11 substantially equal to that of the conduit in one condition, as will be explained hereinafter. Likewise, a plurality of spaced large openings 21, Fig. 3b, are positioned in base 18 of the pressure chamber 11. The passage of fluid, as air in my example, into the pressure chamber 11 through large opening 21 is controlled by spring-biased flap valve, or the like, unidirectional flow valve 22 secured to wall 18 as by hinge 23. Spring 32 on valve 22 is for merely positioning the valve closed when no pressure differential exists on both sides thereof, and accordingly need be only a comparatively weak spring. Gasket 33 may be provided on the valve to ensure a fluid tight seal when it is closed.

The open side of channel member 17—18—19 is closed with a flexible, substantially non-elastic, annular diaphragm 24 which, while it consists of at least one sheet of fabric impregnated with rubber, it may comprise a sheet of vinyl plastic or the like. A further characteristic necessary in the material of the diaphragm is its ability to withstand a wide variation in temperature. In Fig. 3b, the inner and outer edges 25 and 26, respectively, of diaphragm 24 are secured, as by bonding or the like, in a fluid tight relationship to the respective edges 27 on inner side wall 19 and 28 on outer side wall 17 of the channel member.

Seal member 12, Fig. 3a, comprises a relatively stiff annular forging, or the like, with an inner annular lip portion 29 contiguous with and secured, as by welding, to the end 14 of the conduit section 16 which is broadly in juxtaposition with end 13 of the other conduit section 15.

A radially outwardly extending portion 30 of seal member 12 carries a sealing flange 31 with a smooth arcuate edge surface for frictional contact with diaphragm 24 of the annular pressure chamber 11. Radially extending portion 30 spaces the sealing flange or lip 31 intermediate the edges 27 and 28 of channel member 17—18—19 and in the intermediate portion of the diaphragm 24, as illustrated in Figs. 3a and 3b.

To interconnect the ends 13, 14 of the two conduit sections 15 and 16, respectively, pressure chamber member 11 is secured to one section end, 13, and seal member 12 is secured to the other adjacent section end 14. In its free state, diaphragm 24 assumes a smooth convex profile (not shown) due to its inherent stiffness, protruding outwardly of the pressure chamber 11. Then after one conduit section is fixed in its position, the other conduit section is merely moved into position and secured contiguous with the first conduit section so that the sealing flange or lip 31 is pressed against diaphragm 24, thereby sealing the two conduit sections. While the two adjacent section ends to be sealed may be positioned in a restricted area, each section may be maintained in position by any conventional holding means on the section, per se, in an accessible area spaced from the section ends to be sealed. To disconnect the two sections, as may be required for service changes, the mere withdrawing of one section from contiguous relationship with the other section is all that is necessary.

Fig. 3a illustrates operation of the disclosed flexible sealing connector between the sections of a conduit with fluid flow therein and wherein the pressure internally of the conduit is a high, positive pressure, greater than the pressure of the surrounding medium, or conduit external pressure. When utilizing sections 15, 16 as an aircraft jet engine air intake conduit, the ram air alone maintains a high, positive, conduit internal pressure, as 15 pounds per square inch gauge for example, and which is greater than the external or ambient air pressure that may range from —5 p. s. i.g. to +5 p. s. i. g. The pressure is chamber 11 of the seal assembly likewise is maintained substantially equal to that in the conduit due to vent orifice 20 permitting air to enter the pressure chamber and due to opening 21 being closed by spring-biased valve 22 and constrained in closed position by the additional force of the chamber air pressure. Thus with the pressure internally of connector pressure chamber 11 higher than the surrounding atmospheric air pressure, diaphragm 24, which forms the extreme end of section 15 will bulge outwardly of chamber 11 against seal member 12, the extreme end of connecting section 16. While the pressure is substantially equal on both sides of the inner part of diaphragm 24, i. e., that part between sealing flange 31 and diaphragm inner edge 25, the pressure is unequal on the sides of the outer part of diaphragm 24 between sealing flange 31 and diaphragm outer edge 26. Here the difference is approximately 15 p. s. i. in the above example. The diaphragm 24 is forced to the left as illustrated in Fig. 3a, and accordingly the ends 13 and 14 of sections 15 and 16 are sealed.

Fig. 3b illustrates operation of the disclosed flexible sealing connector in a conduit having a fluid flow therein, but wherein the pressure internally of the conduit is a low, negative pressure, less than the pressure of the surrounding medium or conduit external pressure. This situation may result with use of my ducts 15 and 16 in forming an aircraft engine air intake conduit when the engine is running, but the aircraft is moving with insufficient speed to provide any ram air pressure. Accordingly, the conduit internal pressure of —2 to —7 p. s. i. g. for example, is much less than the external or ambient air pressure of ±0.2 p. s. i. g. In this condition the internal pressure of chamber 11 seeks to equal the internal pressure of the conduit sections 15, 16 because of small vent orifice 20. Accordingly, due to the unbalance in pressure against unidirectional flow valve 22, the valve opens, uncovering large opening 21 and permitting the ambient air to readily enter and build the internal pressure of the pressure chamber 11 up to substantially ambient air pressure. Due to the great difference in size of the large opening 21 for supplying air to the pressure chamber 11 over the small venting orifice 20 as illustrated in Figs. 3a and 3b, the internal pressure of chamber 11 is maintained substantially equal to that of the ambient air. Accordingly, with the pressure internally of connector pressure chamber 11 higher than the adjacent pressure of sections 15, 16, diaphragm 24 will be forced outwardly of chamber 11 against seal member 12. While the pressure is substantially equal on both sides of the outer part of diaphragm 24, i. e., that part between sealing flange 31 and the diaphragm outer edge 26, the pressure is unequal on the sides of the inner part of diaphragm 24 between sealing flange 31 and diaphragm inner edge 25, the difference being approximately 5 p. s. i. in the above example. The diaphragm 24 is forced to the left as illustrated in Fig. 3b, and accordingly the ends 13 and 14 of conduit sections 15 and 16 are sealed.

From the above operation, the frictional sealing contact or engagement between the diaphragm 24 of the pressure chamber 11 and the sealing flange 31 of seal member 12 due to passage of fluid to the hollow pressure chamber 11 from either the conduit or from externally of the conduit via openings or passages 20, 21, is improved with increase in the pressure differential between the conduit internal pressure and the surrounding or ambient pressure in both cases of relatively high conduit pressure and of relatively high ambient pressure.

Accordingly, due to the particular construction involved, it is evident that the flexible sealing connector provides an efficient, simple, and quickly-detachable seal between two sections in a fluid flow conduit wherein relative angular and axial movement may exist between the section ends. Further, the disclosed sealing assembly provides a very efficient quick-connect and quick-disconnect attaching means between the ends of two sections in a conduit having a high, internal pressure relative to the external, ambient air pressure, or in a fluid flow conduit having a low, negative pressure relative to the outside atmospheric pressure. Accordingly, the disclosed flexible sealing connector is particularly advantageous for joining the ends of two sections in a conduit wherein the internal pressure fluctuates from a low, negative pressure relative to the outside ambient pressure to a high, positive pressure in the conduit relative to the external ambient pressure, alternating in pressures as often as required, as would occur in the engine air intake conduit of an aircraft as it starts from a standstill on the ground until it reaches flying speed, and again lands. No clamps or latches are necessary to manipulate in using my pressure seal assembly to join two sections of a conduit together. Accordingly, a sealing connector is provided for joining two sections of a conduit together which is easy to attach, inexpensive to manufacture, resistant to extreme temperatures, and light in weight.

The disclosed sealing connector therefore provides a secure seal, free from possible fractures, between section ends in a conduit which may be subjected to relative angular movement or to relative axial movement, or both of such movements due to vibratory, expansive, or contractive forces, or the like.

It will be obvious to those skilled in the art that various changes may be made in the invention without departing from the spirit and scope thereof and therefore the invention is not limited by that which is shown in the drawings and described in the specification, but only as indicated in the appended claims.

I claim:

1. A quick-detachable flexible sealing connector for forming a seal between two co-axial abutting section ends in a restricted area in a fluid flow conduit comprising, an annular channel member forming an annular pressure chamber having a base substantially normal and concentric to the conduit longitudinal axis and interconnecting an inner side and an outer side of said channel member, said base adapted to be secured to one of the section ends with said channel member inner side substantially coplanar with the walls of the conduit, a flexible diaphragm secured to the edges of said inner side and said outer side for closing the open side of said channel member for forming the annular pressure chamber, a small vent orifice in said inner side, a large opening in said base, a spring-biased valve means associated with said opening to permit fluid to pass through said large opening only for entering said chamber, and a seal member comprising an inner annular lip portion adapted to be secured to the other duct end, a radially projecting portion extending outwardly from said inner securing portion, and an outer sealing flange extending from said radially projecting portion for frictionally and sealingly engaging said diaphragm.

2. A quick-detachable flexible sealing connector in combination with a conduit having two co-axial adjacent section ends, said connector comprising a hollow annular pressure chamber secured to one of said section ends and forming an extension thereof and an annular sealing lip secured to the other of said section ends and forming an extension thereof, an annular flexible diaphragm comprising a side of said annular pressure chamber in abutting relationship with said annular sealing lip, a small fluid passage from said conduit to said annular pressure chamber to provide fluid flow to said annular pressure chamber for increasing the frictional and sealing engagement of said diaphragm with said annular sealing lip for sealing said section ends when the conduit pressure is greater than the external ambient pressure, and a large opening in said annular pressure chamber externally of said conduit having a valve means for providing external ambient fluid flow to said annular pressure chamber for increasing the frictional and sealing engagement of said diaphragm with said annular sealing lip for sealing said section ends when the conduit pressure is less than the external ambient pressure.

3. A quick-detachable flexible sealing connector in combination with a conduit having two co-axial adjacent section ends, said connector comprising a flexible hollow annular pressure chamber and an annular sealing lip, said chamber comprising an annular arcuate member secured to one of said section ends, a diaphragm secured over said arcuate member to form said flexible annular pressure chamber therewith, said seal member secured to the other of said adjacent section ends and extending to and in contiguous relationship with said diaphragm, a vent orifice means in said arcuate member to permit fluid in the conduit to flow into the pressure chamber for increasing the frictional and sealing engagement of said diaphragm with said sealing lip for sealing said section ends when the conduit pressure is greater than the chamber pressure, another opening means in said arcuate member to permit the outside ambient fluid to flow into the pressure chamber for increasing the frictional and sealing engagement of said diaphragm with said sealing lip for sealing said section ends when the conduit pressure is less than the chamber pressure, and valve means for closing said other opening means when the chamber internal fluid pressure is greater than the outside ambient pressure and for opening said other openings means when the outside ambient pressure is greater than that inside.

4. A quick-detachable flexible sealing connector in combination with a conduit having two co-axial adjacent section ends, said connector comprising a flexible hollow annular chamber means for one of said section ends and an annular sealing lip means for the other of said section ends, an annular flexible diaphragm comprising a side of said annular chamber means, said annular chamber means having means for permitting the fluid pressure in said chamber to increase relative to the external ambient fluid pressure for forcing said diaphragm into frictional and sealing engagement with said sealing lip means for sealing said section ends when the fluid flow pressure therein is greater than the ambient fluid pressure, said chamber means having additional means for permitting the fluid pressure in said chamber to increase relative to the conduit internal fluid pressure for forcing said diaphragm into frictional and sealing engagement with said sealing lip means for sealing said section ends of said conduit when the fluid flow pressure in said conduit is less than the ambient fluid pressure, and valve means for closing said additional means when the chamber internal fluid pressure is greater than the ambient pressure and for opening said additional means when the ambient pressure is greater than that inside.

5. A quick-detachable flexible sealing connector in combination with a conduit having two co-axial adjacent section ends, said connector comprising a flexible hollow chamber means for one of said section ends and a sealing lip means for the other of said section ends, means for transmitting a fluid pressure greater than the outside ambient fluid pressure to said chamber for forcing said chamber means into frictional sealing engagement with said sealing lip means for sealing said sectional ends when the fluid pressure therein is greater than the ambient pressure, additional means for transmitting a fluid pressure greater than the conduit fluid pressure to said chamber for forcing said chamber means into frictional and sealing engagement with said sealing lip means for sealing said section ends of said conduit when the fluid pressure in said conduit is less than the ambient fluid pressure, and valve means for closing said additional means when the conduit internal fluid pressure is greater than the outside ambient pressure and for opening said additional means when the outside ambient pressure is greater than that inside.

6. A quick-detachable flexible sealing connector in combination with a conduit having two co-axial adjacent section ends, said connector comprising a hollow pressure chamber means for one of said section ends and a sealing lip means for the other of said section ends, said pressure chamber means having a first passage means responsive to a pressure differential between the conduit internal pressure and the conduit external ambient pressure when said conduit internal pressure is greater than said conduit external pressure for transmitting a fluid pressure greater than said external ambient fluid pressure into said chamber means for forcing said chamber means into frictional and sealing engagement with said sealing lip means for sealing said section ends, said pressure chamber means having a second passage means responsive to a pressure differential between the conduit internal pressure and the conduit external pressure when said conduit internal pressure is less than said conduit external pressure for transmitting a fluid pressure greater than said internal fluid pressure to said chamber means for forcing said chamber means into frictional and sealing engagement with said sealing lip means for sealing said section ends, and valve means for closing said second passage means when the internal fluid pressure is greater than the external ambient pressure and for opening said second passage means when the external ambient pressure is greater than that inside.

7. A quick-detachable flexible sealing connector means for forming a seal between two co-axial abutting section ends in a restricted area in a fluid flow conduit comprising, a hollow pressure chamber means for one of said section ends and a sealing lip means for the other of said section ends, said pressure chamber means having a first passage means responsive to a pressure differential between the conduit internal and external pressures when the conduit internal pressure is greater than the conduit external pressure for transmitting a fluid pressure greater than said external ambient fluid pressure to said chamber means for frictionally and sealingly engaging said pressure chamber means with said sealing lip means for sealing said section ends, said pressure chamber means having a second passage means responsive to a pressure differential between the conduit internal and external pressures when the conduit internal pressure is less than the conduit external pressure for transmitting a fluid pressure greater than said internal fluid pressure to said chamber means for sealing said section ends, and valve means for closing said second passage means when the internal fluid pressure is greater than the external pressure and for opening said second passage means when the external pressure is greater than that inside.

8. A quick-detachable flexible sealing connector means for forming a seal between two co-axial abutting section ends in a restricted area in a fluid flow conduit comprising, a hollow pressure chamber means comprising a first passage means responsive to a pressure differential between the conduit internal and external pressures when the conduit internal pressure is greater than the conduit external pressure for transmitting a fluid pressure greater than said external fluid pressure to said chamber means for sealing the section ends, said hollow pressure chamber means comprising a second passage means responsive to a pressure differential between the conduit internal and external pressures when the conduit internal pressure is less than the conduit external pressure for transmitting a fluid pressure greater than said internal fluid pressure to said chamber means for sealing the section ends, and valve means for closing said second passage means when the internal fluid pressure is greater than the external pressure and for opening said second passage means when the external pressure is greater than that inside.

9. A quick-detachable flexible sealing connector means for forming a seal between two co-axial abutting section ends in a restricted area in a fluid flow conduit comprising, a hollow pressure chamber means having two passages, one of said passages having means for transmitting fluid pressure from said conduit to said chamber, the other passage having means for transmitting fluid pressure from externally of said conduit to said chamber, said chamber means being responsive to a pressure differential between the conduit internal and external pressures for sealing the section ends, and valve means for closing said other passage means when the internal fluid pressure is greater than the external pressure, and for opening said other passage means when the external pressure is greater than that inside.

References Cited in the file of this patent

UNITED STATES PATENTS

| | | |
|---|---|---|
| 255,523 | Lightburne | Mar. 28, 1882 |
| 2,419,750 | Wiberg | Apr. 29, 1947 |
| 2,726,102 | Webb | Dec. 6, 1955 |